INVENTOR
AUGUST LEIB

March 17, 1936.  A. LEIB  2,034,520
RADIO RECEIVER ARRANGEMENT FOR LANDING AIRCRAFT
Filed April 17, 1933  2 Sheets-Sheet 2

INVENTOR
AUGUST LEIB
BY
ATTORNEY

Patented Mar. 17, 1936

2,034,520

UNITED STATES PATENT OFFICE 2,034,520

RADIO RECEIVER ARRANGEMENT FOR LANDING AIRCRAFT

August Leib, Berlin, Germany, assignor to Telefunken Gesellschaft fur Drahtlose Telegraphie m. b. H., Berlin, Germany, a corporation of Germany Application April 17, 1933, Serial No. 666,402
In Germany April 21, 1932

5 Claims. (Cl. 250—11)

This invention relates to a new and improved radio receiver arrangement for landing aircraft in all kinds of weather in which the visibility is poor.

In order to enable airplanes to land also in weather with little or no visibility a transmitter is arranged near the place of landing for transmitting either a concentrated beam as when landings are to be made in one direction, or equal beams for all azimuthal planes for landing in any desired direction. This radiation as a rule consists of short waves possessing a comparatively small range and it is distributed in space in such manner that a definite constant field intensity is obtained for the points of a line having such form that it is suited to be used as a landing curve.

A better understanding of this invention will be obtained from the following detailed description when read in connection with the accompanying drawings in which Figure 1 shows diagrammatically the outline of a radio beam having lines of equal field intensity such as may be followed by an airplane when making a landing;

Figure 1:
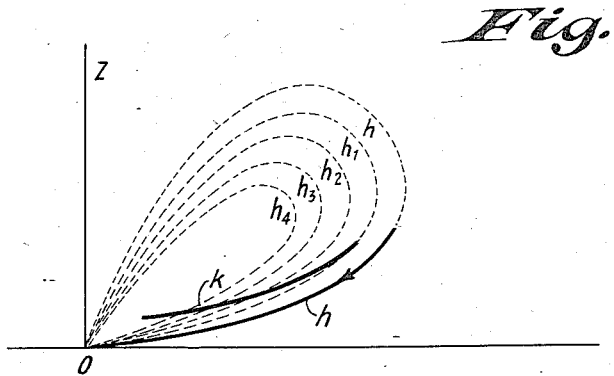

Referring now in detail to the drawings, Figure 1 shows such line of constant intensity $h$ for a vertical plane in which the lower portion indicated in full lines can be used as a landing curve. When the radiation emitted from a transmitter arranged in point O is concentrated then the landing curve $h$ is in the vertical center plane of the beam. For a radiation equal for all azimuthal planes the landing curves $h$ which can be used for all directions of landing form a bowl-shaped rotation surface with the vertical axis OZ. For the landing in fog the pilot uses a receiver tuned to the radiation for the landing whose indicator serves for controlling the field intensity and which therefore must as such continuously indicate the definite field intensity $h$ during landing.

It is of very great importance to also be able to determine with sufficient accuracy and at any time during the landing in fog the distance from the landing transmitter. To this end it has been proposed to transmit a further radiation for which the distribution in space is different from that of the radiation used for determining the curve of landing. Since the craft moving upon the landing curve $h$ receives different field intensities of the second radiation, a measuring instrument for these field intensities if it is once calibrated can be used as a distance measuring instrument.

The present invention affords an essential simplification of the system used for landing in fog in that the emission of the second radiation (serving for distance measuring) is therewith eliminated. The invention is based upon the fact that for the radiation serving for determining the curve of landing, the lines and surfaces respectively of different constant field intensities with regard to each other are not equidistant. Thus in Figure 1 the lines of constant field intensities $h$, $h_1$, $h_2$, $h_3$ etc. diverge more and more as the distance from the point of emission progresses. If, therefore, besides the antenna which is used while landing to follow the landing curve or line of constant field intensity $h$, a second receiving antenna is arranged upon the air craft at a certain height relative to that of the former antenna (higher or lower), this second antenna moves during landing upon a line $k$ being equidistant relative to the landing curve $h$ so that this antenna continuously intersects during landing the various lines $h_1$, $h_2$, $h_3$, $h_4$ . . . of constant field intensity. Therefore, a measuring apparatus for these field intensities which is calibrated in distances can serve as a distance indicator. Since by ascertaining the distance of an airplane flying in the landing curve $h$ from the transmitter definitely indicates at the same time also the respective height of the airplane from the ground, the measuring instrument for the field intensities can also be calibrated in heights.

It is obvious that the two landing receiver antennae may supply two different corresponding receivers. Although from the point of view of economy in space and cost such an arrangement is not suitable. In addition thereto it would be necessary when using two receivers to take the proper care to see that neither one of the two receivers at any time change the sensitivity thereof. Therefore, the most advantageous arrangement is that in which one or the other receiving aerial for the landing is connected at will to the single landing receiver.

Figure 2:
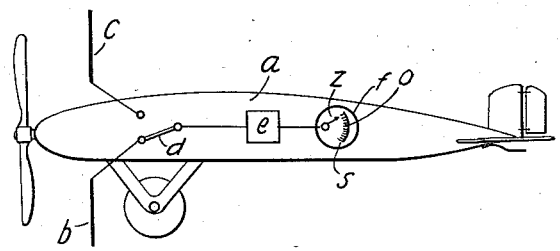
Fig. 2 shows one embodiment of suitable receiving apparatus located on board an airplane.

Figure 2 shows an embodiment of the invention by way of example. On an air plane ($a$) two receiving aerials for landing are arranged at different heights, one of which, the lower one for instance, serves for control of the constant field intensity $h$ of the landing curve, while the other one serves for distance measuring. By means of a switch $d$ one or the other aerial is connected at will to the landing receiver $e$. The latter supplies output energy for operating an indicator. When following the landing curve, i. e., when antenna $b$ is connected, the pilot must aim at maintaining the pointer $z$ of the indicator $f$ continuously upon the approximate central marking $h$ of the scale $s$. For distance measuring, the switch $d$ is moved from time to time so as to connect antenna $c$. The pointer $z$ is deflected from the central position 0 whereby the distances or (and) the heights can be observed on the correspondingly calibrated scale.

Figure 3:
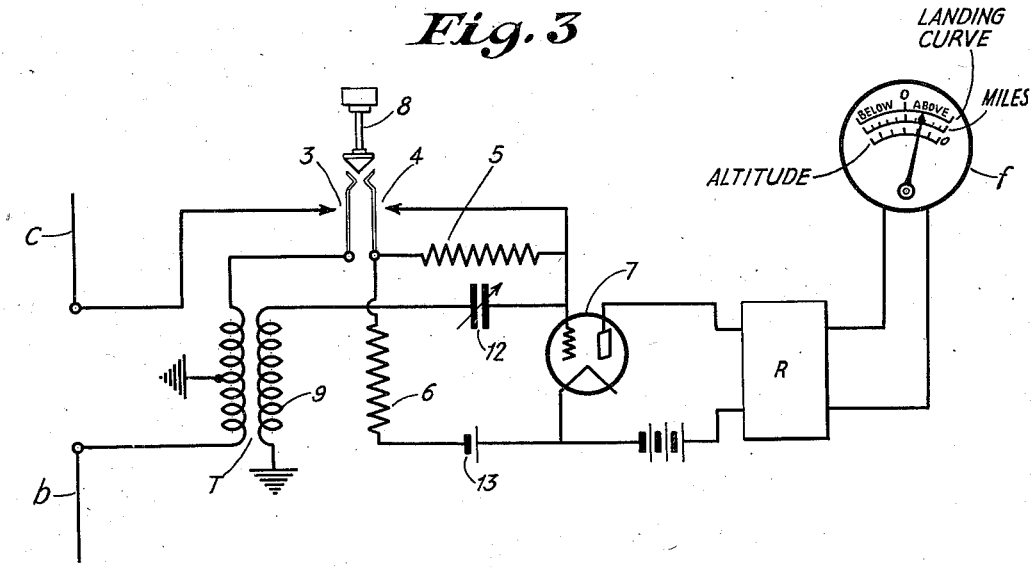
Fig. 3 shows a modification of the receiving apparatus when a choice of several different indications is to be made.

Fig. 3 illustrates an embodiment of the invention which is suitable for determining, at one time, both the distance from the landing field or beam transmitter and also the altitude at which the aircraft may be flying above the ground level. When, however, it is desired to show merely an indication of the landing curve the same instrument $f$ may also be used for this purpose.

The circuit arrangement for variably transferring the received signals to the instrument $f$ preferably includes a permanent connection between the antenna $b$ through a portion of a primary winding on the transformer T. The primary winding has a grounded center tap. The secondary winding may be connected across a capacitor 12 to the grid of an electron discharge tube 7. This grid may be suitably biased by means of a source of potential 13 in circuit between the cathode, and two bias resistors 6 and 5 respectively. The output circuit of the tube 7 feeds to a further portion of the receiving apparatus R and thence to the instrument $f$.

When it is desired to follow the landing curve, the antenna $b$ alone will be utilized. When, however, an indication of distance or altitude is to be made, it then becomes necessary to determine the difference between the signal strengths as collected by the two antennae $b$ and $c$ respectively. In this case a push button 8 is provided for closing the contacts 3 to connect antenna $c$ with a half of the primary winding of the transformer T opposed to the half winding previously mentioned. Connection is also made between the two ends of the resistor 5 through the contacts 4 thereby shorting out the resistor 5 and introducing a different bias potential on the grid of the tube 7. This arrangement may be found desirable in view of the weakened output of the tube 7 where the signal strengths collected by the two antennae $b$ and $c$ are opposed to one another and only the differential thereof is utilized for actuating the instrument $f$. Hence the tube 7 may then be worked on a different portion of its characteristic.

Referring again to Fig. 1, it will be seen that as the aircraft approaches the point of landing, 0, a greater and greater difference between the signal strengths of the lines $h$ and $k$ will be impressed upon the instrument $f$ through the amplifier and detector R. The zero position on the scales representing miles and altitude respectively will, preferably, be at that end of the scale corresponding with a maximum voltage reading. The scale on the other hand which shows the landing curve is preferably provided with a zero mark near the center, so that when the signal strength decreases an indication is made by a movement of the pointer, say, to the left of the zero mark, in which case the aircraft would be below the landing curve, whereas a movement of the pointer in response to a stronger signal would indicate that the aircraft is flying above the landing curve.

If it is desired to adapt the arrangement in such manner that the control of the field intensity $h$ of the landing curve is at no time interrupted, the receiver ($e$) may supply two indicators, alternately and simultaneously commutable together with the antennae, one of which serving for the control of the landing curve and the other one for distance measuring. In this case the commutation must be effected by means of some suitable driving mechanism in such rapid rhythm as to prevent pendulum movement of the pointers of the two instruments.

Figure 4:
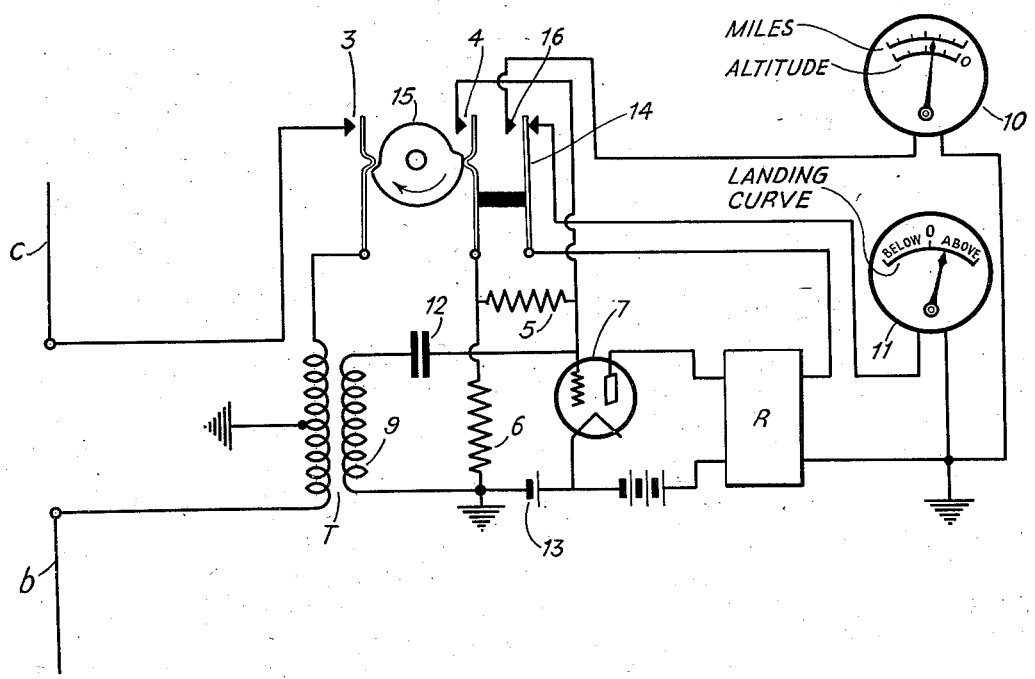
Fig. 4 shows a further modification of the invention which is useful when a plurality of indications is to be made simultaneously.

Fig. 4 illustrates one embodiment of receiving apparatus suitable for the simultaneous operation of two indicators 10 and 11. The indicator 10 may be an instrument calibrated to read both in miles of distance from the landing field, and in feet of altitude above the ground level. The indicator 11 may be an instrument calibrated to show a zero reading when the landing curve is followed, while deflections of the needle to the left and right respectively indicate that the airplane is below and above the landing curve.

The antenna $b$ which is carried suitably for following the landing curve is connected to one half of the primary of a transformer T. This primary has a grounded center tap. The secondary winding 9 is connected across from ground to a capacitor 12 whereby input energy may be impressed upon the control electrode of an electron discharge tube 7. When signals are to be utilized for actuating the instrument 11, the grid of the tube 7 may be suitably biased by means of a source of potential 13 in circuit between the cathode and the grid, this biasing circuit including also two resistors 5 and 6. The output circuit of the tube 7 feeds to a further portion of the receiving apparatus R which may include suitable amplifying and detecting stages. The utilization circuit which transfers the signals from the amplifier-detector to the instrument 11 includes a switching device having a movable contact spring 14 arranged to make contact with front and back contacts in response to a rotative movement of a cam 15 which may be driven continuously by any suitable means. In the position shown in the drawings the spring 14 makes contact with its back contact and feeds energy to the instrument 11.

When the cam 15 rotates through 180° the contact springs 3 and 4 will engage with their companion contacts while contact spring 14 engages with a front contact 16. The switching arrangement which includes these contact springs is then set to transfer signals received on both antennae $b$ and $c$ to the instrument 10. In this case it may be desirable to bias the grid of the tube 7 differently than is indicated for following the landing curve. The reason for this is that when deriving a differential between the intensities of the respective fields followed by the antennae $b$ and $c$, the resultant signal strength may be so weak in comparison with the unopposed signal strength as received on one antenna that it would be desirable to work the tube 7 on a different portion of its characteristic. Hence the resistor 5 may be short-circuited by the closing of the contacts 4. This would then render the grid of the tube 7 more positive than before.

It will be seen from the circuit diagram of Fig. 4 that the closing of the contacts 3 connects the antenna $c$ to a half of the primary winding of the transformer T which opposes the previously mentioned half of the transformer primary connected permanently with the antenna b. By such an arrangement, which includes the grounded center tap on the primary winding of the transformer T, it is possible to obtain a differential effect between the strengths of the received signals as collected by the antennae b and c respectively.

It will be understood that any suitable means may be provided for rotating the shaft carrying the cam 15 so rapidly that there will be no appreciable vibration of the pointers on the two instruments 10 and 11 respectively.

In order to correctly indicate the necessary field intensity h for following the landing curve, or for measuring distances, making use of the described arrangement, it is of great importance that a constant degree of sensitivity should be maintained. Any well-known method of checking and adjusting the calibration of the instruments may, therefore, be employed from time to time as occasion may require.

I claim:

1. An aircraft receiver arrangement for landing under conditions of unfavorable visibility comprising two antennae arranged in the same plane but at different heights on said aircraft, switching means connected to said antennae so as to alternately connect either one of said antennae to a receiver, and a visual indicator electrically connected to said receiver to provide indication of the field intensity of a predetermined landing curve.

2. An aircraft receiver arrangement for landing under conditions of low visibility comprising two antennae arranged in the same plane but at different heights on said aircraft, switching means connected to said antennae so as to alternately connect either one of said antennae to a receiver, and a visual indicator electrically connected to said receiver, calibrated scale on said indicator to provide a means for determining the distance said aircraft is from a landing transmitter.

3. An aircraft receiver arrangement for landing aircraft when normal visibility is impaired, comprising two antennae arranged in the same plane but at different heights on said aircraft, switching means connected to said antennae to connect at will either one of said antennae to a receiver, a visual indicator electrically connected to said receiver, and a calibrated scale on said indicator to provide means for determining the distance said aircraft is from a landing transmitter, said scale having an approximate central mark to indicate a control field intensity of a landing curve from said transmitter.

4. An aircraft receiver arrangement for landing aircraft when normal visibility is impaired, comprising two antennae arranged in the same plane but at different heights on said aircraft, one of said antennae arranged to be connected to a receiver, an indicator to indicate a constant field intensity of a landing curve from a transmitter, the other of said antennae arranged to be connected to a receiver, and an indicator to determine the distance said aircraft is from said transmitter.

5. An aircraft receiver arrangement for landing aircraft when normal visibility is impaired, comprising two antennae arranged in the same plane but at different heights on said aircraft, and a driving mechanism having a commutator arrangement for switching each of said antennae to a receiver, said receiver being electrically connected to two visual indicators so that said receiver may supply indicating energy to said indicators alternately and simultaneously commutable with each of said antennae, one of which indicates control of the landing curve from a landing transmitter, the other indicator arranged to indicate the distance said aircraft is from said transmitter.

AUGUST LEIB.